July 20, 1937.　　　　B. C. PLACE　　　　2,087,358
FASTENER FOR SECURING RODS, TUBES, AND THE LIKE
Filed July 29, 1931
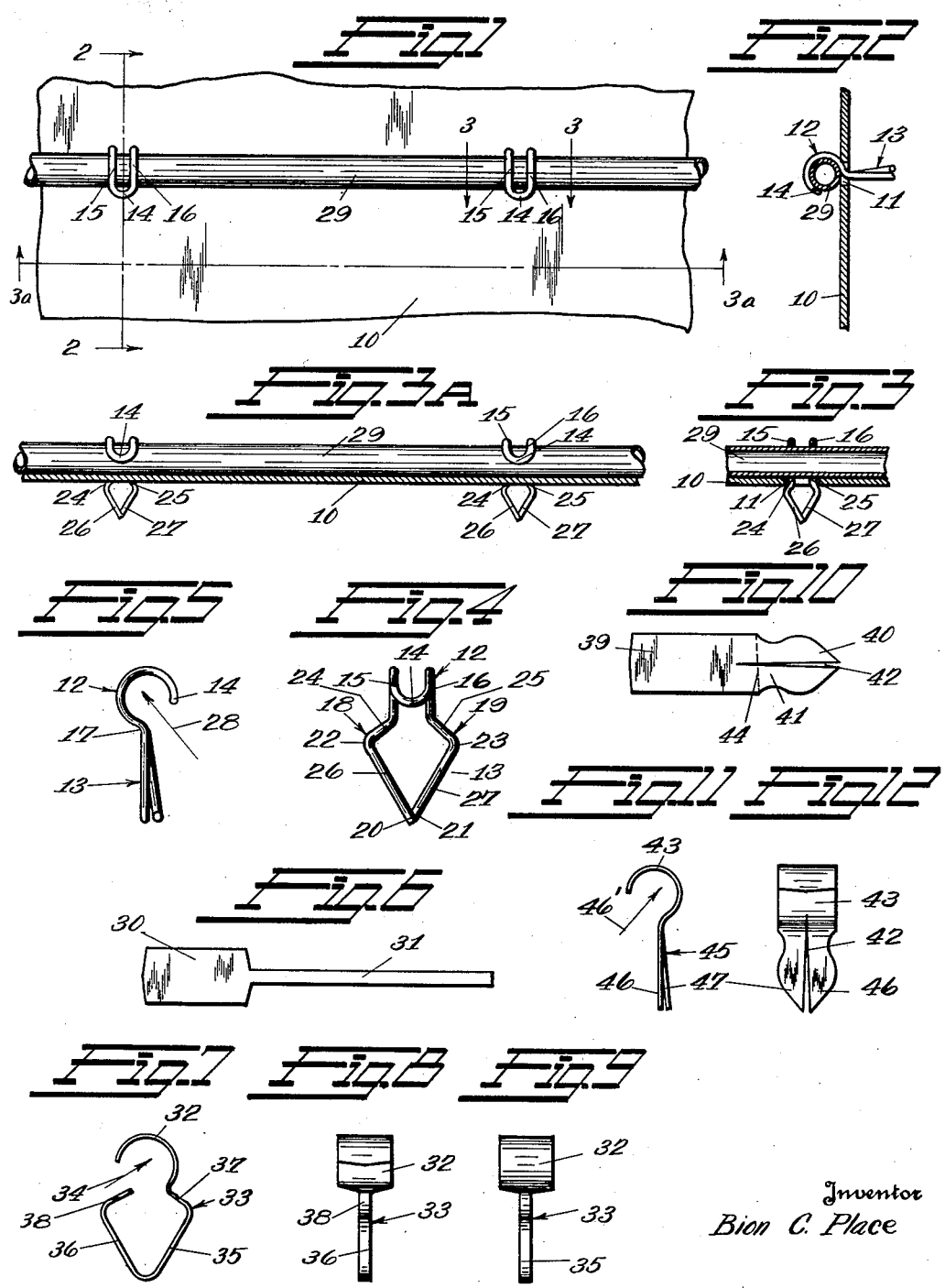
Inventor
Bion C. Place Patented July 20, 1937

2,087,358

UNITED STATES PATENT OFFICE 2,087,358

FASTENER FOR SECURING RODS, TUBES, AND THE LIKE

Bion C. Place, Detroit, Mich., assignor of one-half to George E. Gagnier, Detroit, Mich.

Application July 29, 1931, Serial No. 553,876

4 Claims. (Cl. 24—73)

This invention relates to a method and arrangement for securing elongated elements such as rods, tubes, electrical conductors and the like to metallic supporting structures. More specifically, the invention contemplates the securing of such elements by means of spring or snap fasteners that serve to apply a continuously effective pressure drawing the element against said metallic supporting structure.

Primarily, the present invention is intended to provide an arrangement for securing tubing and electrical conductors to metallic automobile bodies, or the chassis thereof, though, as will be obvious, the invention is capable of use in many other analagous situations. In securing electrical cables and tubing to metallic bodies it has heretofore been the general practice to utilize clips, that straddle the tubing or cables, which clips are provided with laterally extending ears that are perforated to receive fastening elements, which may be bolts, screws or the like. Such fastening arrangements are not satisfactory, because the number of parts that enter into the assembly are numerous, and the securing of the clips in position on the supporting structure is troublesome, because of the necessity of entering the separate fasteners in the apertures provided in the clips and the supporting structure which in operation requires alining of the openings in the clips with the openings in the supporting structure.

This invention aims to provide an extremely simple and inexpensive fastener designed particularly to attach relatively light-weight elongated elements, such as tubes, rods, electrical conductors and the like to metallic supporting structures of various kinds, which structures need be provided only with a single perforation or opening to receive each fastening element.

A still further object of the invention is to provide a method of attaching elongated elements, such as rods, tubes, conduits or the like, by providing fastening elements of the spring type that can be assembled with respect to the elements prior to the insertion of the fastener in the perforation or opening in the supporting structure, provided to receive it, and in which the arrangement is such that, after the fastening element has been inserted in said perforation or opening, the elongated element is firmly held against the supporting structure with a continuously effective yielding pressure.

A further object of the invention is to provide a method of securing elongated elements such as rods, tubes, conduits or the like to a supporting structure by means of snap fasteners designed so that they may be first interlocked with the elements, and so that subsequently the elements may be held in interlocked relation to the supporting structure by snapping the shanks of the fasteners in suitable perforations or openings in the supporting structure.

A still further object of the invention is to provide a fastener for securing elongated light weight structures such as electrical cables, conduits and the like which fastener is designed to grip the elements without chafing, and in which the fastener exerts a continuously effective pull tending to draw the element firmly but yieldingly against the supporting structure.

A still further object of the invention is to provide a spring fastener including a head and a shank, which head is in the form of a hook opening in a direction extending at an acute angle to the length of the shank, so that after an elongated element, such as a rod, tube or the like, is entered into the hook of said head and the shank is subsequently snapped into an opening in the supporting structure the element is firmly held against said structure.

Another object of the invention is to provide a spring or snap fastener for securing an elongated element to supporting structures, which fastener is constructed of a single piece of wire or sheet metal bent or shaped so as to provide inclined holding shoulders that serve to exert a continuously effective pull on the element.

A still further object of the invention is to provide a one-piece wire fastener including a head and a shank, the head and the shank each including a pair of wire arms, those of the head bearing upon the elements at spaced points along the length thereof, while those of the shank are bowed outwardly between the ends thereof to provide guiding portions to facilitate the entry of the fastener in the opening or socket provided to receive it, and to provide at the same time inclined divergently disposed portions, intended to serve as inclined abutments holding the fastener from ready withdrawal from the openings in the supporting structure.

Still further objects of the invention will appear as a description thereof proceeds with reference to the accompanying drawing in which:

Figure 1 is a fragmentary elevational view showing a section of a tube secured to a metallic structure in accordance with the present invention.

Figure 2 is a sectional view taken on the plane indicated by the line 2—2 in Figure 1.

Figure 3 is a longitudinal sectional view taken on the plane indicated by the line 3—3 of Figure 1.

Figure 3a is a sectional view taken on the plane indicated by the line 3a—3a, looking in the direction of the arrows.

Figures 4 and 5 are respectively elevational views, as seen from two directions at right angles to each other, of a preferred form of a fastener forming a part of the present invention.

Figure 6 is a metal blank from which a modified form of spring fastener may be constructed.

Figures 7, 8 and 9 are respectively side, front and rear views of the fastener constructed from the blank illustrated in Figure 6.

Figure 10 is a view of a sheet metal blank from which a further modified fastener may be constructed.

Figures 11 and 12 are respectively side and front views of the sheet metal fastener constructed from the blank shown in Figure 10.

Like reference characters indicate like parts throughout the several figures.

In the construction of automobiles, airplanes, metallic buildings or the like it is frequently necessary to attach elongated elements such as rods, tubes, electrical conductors, conduits and the like to metallic supporting structures of various kinds. In view of the fact that a metallic supporting structure cannot receive a driven fastener, it has generally been the practice to secure such elongated elements by means of bolts, rivets or the like, such bolts or rivets being used in connection with a suitable clip that generally straddled the elongated element. By this invention such elements can be attached to metallic supporting structures with the same facility with which a driven fastener can be driven in a wooden structure.

In the drawing which shows several preferred embodiments of the invention, 10 designates a suitable metallic supporting structure, which as indicated in said figure is generally plate-like in form. In order to secure the tubes, electrical cables, or the like to such a supporting structure in accordance with this invention, it is only necessary to provide said structure with openings or perforations 11 disposed at spaced intervals along the portion of the supporting structure over which the rod, tube or cable is intended to extend. Spring or snap fasteners are used to secure the rod, tube or cable or the like upon the supporting structure, and said fasteners are preferably constructed from a single piece of metal. They may assume any one of a number of forms, though that illustrated in Figures 1 to 5 inclusive, is at present preferred.

As shown in these figures the improved fastener is constructed from a single piece of wire, that is bent to provide a head 12 in the form of a hook, and a shank 13 extending away from said head. The fastener is formed by bending the strip of wire of which it is constituted approximately midway between its ends to form the U-bend 14 constituting the nose of the hook of the head of the fastener. Two arms 15 and 16 are thus provided, which arms are bent into the form of a hook, as illustrated particularly in Figure 5. Said arms are bent so that the hook provided thereby will snugly fit the tube, conduit or the like that is intended to be secured by the particular fastener. In order that the tube, conduit or the like may be readily entered in the hook it is not substantially greater than 180° of arc. The two ends of the wire are then bent at 17 so that they extend approximately radially of the center of the hook providing two arms 18 and 19 which constitute the shank of the fastener. Said arms are bowed outwardly, between the tips 20 and 21 thereof and the bends 17, as indicated at 22 and 23, providing portions 24 and 25 that diverge from each other and other portions 26 and 27 that converge towards each other.

The opening in the side of the hook should be formed so that a line extending centrally therethrough is disposed at an acute angle to the length of the shank of the fastener, said line being indicated by the arrow 28.

The fastener just described is applied to hold an elongated element, such as the tube 29, against the supporting structure 10 in the following manner:

The supporting structure is provided with the openings to permit the attachment of the tube 29 at spaced intervals along the line over which the tube is to pass. The fastener is, first, hooked upon the tube by causing the tube to enter the opening in the hook-shaped head 12, the tube and the fastener assembled as just stated is then brought into the position opposite supporting structure with the fastener opposite the opening 11. If the fastener is not accurately positioned endwise it may be slid along the length thereof, in a manner that will be obvious, to bring the tip of the shank 13 directly opposite said opening. Pressure is then exerted along the length of the shank causing the tube and the fastener assembled with respect thereto to be moved toward the supporting structure and to cause the shank 13 to enter an opening 11. Inasmuch as the overall width of the shank of the fastener exceeds the diameter of the opening 11, the edges of said opening will first engage the convergently disposed guiding portions 26 and 27. A continued application of pressure against the tube and the head of the fastener will cause the arms 18 and 19, constituting the shank of the fastener, to move toward each other in opposition to their natural resilience. Said arms may flex in part with respect to the bend 17, and in part with respect to the U-bend 14 at the nose of the hook-shaped head. As pressure is continued to be applied to the fastener the shank is moved completely through the opening and the points 22 and 23 of maximum bowing are passed through the opening 11. As movement through the opening of the shank of the fastener continues the divergently disposed holding portions 24 and 25 engage the edge of the opening 11 permitting the arms 18 and 19 constituting the shank of the fastener to spring apart. In view of the inclination of the divergently disposed holding portion, it will be understood that said portions exert a wedging action tending to draw the tube 29 toward the supporting structure 10, and since the fastener is proportioned so that the inclined shoulders, provided by the divergently disposed holding portions engage the corners of the opening 11, when the tube is in abutment against the supporting structure it will be apparent that said wedging action is effective when the tube is in operative position on the supporting structure.

By this arrangement a continuously effective pressure is exerted tending to draw the tube toward the supporting structure after the tube is in position resting firmly upon the surface of said structure. In this position it will be observed that an interlock has been brought about between the tube and the supporting structure through the fastener, since the tube cannot be disassembled from the hook-shaped head of the fastener, except by movement in a direction at an acute angle to the length of the shank of the fastener, and after the shank has been inserted in the openings in the supporting structure the tube cannot be moved in this direction. It will be observed therefore that after the tube 29 has been secured at spaced intervals by means of fasteners such as just described, that such tube is held firmly in position on the supporting structure in a manner so that it cannot be disassembled, except by removing the shanks of the fasteners from the openings 11.

The wire from which the fastener is constructed is relatively stiff, being tempered after it has been bent into the desired form, so that the fastener exerts a relatively strong holding action. Nevertheless, if it is necessary to remove the tubes for any purpose the same can be removed by withdrawing the shanks of the fastener from the opening without injury to the fasteners or to the tube. The tube can subsequently be again reassembled in the manner above described.

It will be observed that the fastener just described is constructed of round wire, which is preferred because said rounded wire presents a line contact between the arms 15 and 16, constituting the head of the fastener, and the tubing. There are accordingly no sharp edges, that will chafe or cause undue wear of the tube due to vibration of the structure to which the tube is attached. This is of particular importance in automobile or any other construction subject to vibration that tends to cause chafing or wear of the tubing, electrical cables or the like.

While the wire fastener just described is preferred, other forms of fasteners may be utilized to accomplish substantially all of the results that are accomplished by the use of the preferred wire fastener. One form of such a fastener is made from a blank illustrated in Figure 6. Said blank is first stamped from a sheet of metal in the outline shown in said figure so as to consist of a wide end 30 and a narrow elongated end 31 extending from one end of the wide end 30. The widened portion 30 is bent to provide a hook-shaped head 32, while the narrow elongated portion 31 is bent into approximately the form of a diamond 33, which diamond constitutes the shank of the fastener. In this form of the invention, as in that before described, the opening in the side of the hook 32 is made so that a line, indicated by the arrow 34, passing centrally therethrough is disposed at an acute angle to the length of the shank of the fastener. The diamond shaped shank of this fastener provides a convergently disposed guiding portion 35 and 36 and divergently disposed inclined holding portions 37 and 38 functioning in the manner above described with reference to divergently disposed holding portions 24 and 25. The fastener of this form of the invention is used in precisely the same way as above described with reference to the proposed form.

Still another type of fastener designed to secure in large measure the results that are secured by the preferred form of fastener is constructed from the blank shown in Figure 10, which blank is likewise stamped from a sheet of metal. As illustrated in Figure 10, the blank includes a relatively wide elongated portion 39 disposed at one end thereof and a head 40 connected to the portion 39 by a neck portion 41 of substantially less width than the maximum width of the portion 40 as illustrated. A slit 42 extends from the end of portion 40 well into the portion 39 of the blank.

A hook-headed spring fastener designed to secure elongated elements, such as conduits or the like, may be formed from this blank by bending the portion 39 into the form of a hook 43, and by bending the portion 40 on the dotted line 44 in Figure 10, so that the portion 40 and the neck 41 constitute the shank 45 of the fastener. As in the fasteners previously described the opening in the hook 44 is formed so that a line passing centrally therethrough is located at an acute angle to the shank 45, such line being designated by the arrow 46' (Figure 11).

In order to free the arms 46 and 47 formed by the slit 42 for lateral movement, they are bent slightly out of the plane they originally occupied so that they are not disposed in the same plane, as illustrated in Figure 11. Said arms are thus freed to assume a side by side arrangement, when the shank of the fastener is contracted in entering an opening or perforation in the supporting structure. It will be observed that in this form of the invention each arm 46 and 47 flexes substantially in the plane of the blank, from which it is formed, when the fastener is used in the manner above particularly described with respect to the modifications previously outlined, and that in so flexing the arms move somewhat like the arms of a pair of scissors.

Still other types of fasteners may be used to secure elongated elements such as tubes, rods, conduits or the like to metallic supporting structures in the manner above described. That is, for example, the wire fastener shown particularly in Figures 4 and 5 may as readily be formed by forming the shank from the mid-portion of the wire and permitting the ends of the wire to form the head of the fastener, if it is desired to follow this procedure though the described arrangement is preferred.

In all forms of the fastener it is preferred that the inclined divergently disposed holding portions constituting inclined abutments, to hold the fasteners yieldingly in the openings in which the shanks thereof are inserted, should be arranged so that said inclined abutments are in engagement with the edges of the openings in order that they will exert a continuously effective wedging action tending to draw any element secured thereby firmly toward the supporting structure.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A sheet metal snap fastener comprising a strip of metal one end of which is bent to form an open hook and the other end of which is separated into two arms having their respective edges formed to diverge from said end of the strip and then converge toward said hook, said arms being capable of passing each other like the arms of a scissors, the opening in said hook facing toward said arms and extending at an acute angle to the length of said arms whereby any element inserted in said hook is held therein by abutment against a supporting surface when said arms are snapped in an opening therein.

2. A one-piece tube or conduit fastener comprising a head in the form of an open hook, and a shank connected to one arm of the hook and bent into the shape of a diamond, the opening in said hook facing toward said shank and extending at an acute angle to the shank.

3. A one-piece tube or conduit fastener comprising a U-shaped head, an expansible and contractible shank depending from one arm of the U, the opening in said U facing downwardly toward said shank whereby the tube or conduit will be held upon a supporting structure when said shank is snapped in an aperture in said structure.

4. A one-piece wire fastener designed to attach elements in the form of tubes, rods, conduits or the like to a metallic supporting structure, consisting of a head in the form of a hook formed from the mid-portion of the wire including two arms each of which is hoop-shaped, and a shank formed from the ends of said wire and comprising two arms each of which is carried by an arm of said head, the latter arms being shaped to provide means to hold said elements firmly and yieldingly against said supporting structure.

BION C. PLACE.